US000001076H

United States Statutory Invention Registration [19]

[11] Reg. Number: H1076

Slane et al. [43] Published: Jul. 7, 1992

[54] LITHIUM ION RECHARGEABLE INTERCALLATION CELL

[75] Inventors: Steven M. Slane; Donald L. Foster, both of Neptune City, N.J.

[73] Assignee: The United States of America as represented by the Secretary of the Army, Washington, D.C.

[21] Appl. No.: 625,181

[22] Filed: Dec. 10, 1990

[51] Int. Cl.[5] ..... H01M 6/14
[52] U.S. Cl. ..... 429/194; 429/197
[58] Field of Search ..... 429/194, 197

[56] References Cited

U.S. PATENT DOCUMENTS 4,423,125 12/1983 Basu ..... 429/218
4,751,160 6/1988 Plichta et al. ..... 429/197

*Primary Examiner*—Brooks H. Hunt
*Assistant Examiner*—Daniel J. Jenkins
*Attorney, Agent, or Firm*—Michael Zelenka; Roy E. Gordon

[57] ABSTRACT

A lithium ion rechargeable intercallation cell is provided including a lithiated graphite anode, a lithiated oxide cathode, and a solution of a lithium salt in a solvent that cycles both the lithiated graphite anode and the lithiated oxide cathode as the electrolyte.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LITHIUM ION RECHARGEABLE INTERCALLATION CELL

GOVERNMENT INTEREST

The invention described herein may be manufactured, used, and licensed by or for the Government for governmental purposes without the payment to us of any royalty thereon.

FIELD OF INVENTION

This invention relates in general to a lithium ion rechargeable intercalation cell and in particular to such a cell wherein the anode is a lithiated graphite, the cathode is a lithiated oxide, and the electrolyte is a solution of a lithium salt in a solvent that cycles both the lithiated graphite anode and the lithiated oxide cathode.

BACKGROUND OF THE INVENTION

The demand for energy storage devices with improved performance and safety characteristics has increased with the development of new technologies requiring batteries as power sources. A wide range of electrochemical characteristics must be accommodated for these new technologies. Some critical characteristics that power sources must accommodate are energy density, low temperature performance, high rate capability, low cost, reliability, and safety. A key objective is to develop a battery chemistry to meet required power source characteristics of new equipment technologies. An important objective in developing a practical rechargeable lithium battery is to have a cathode/anode combination that is stable with the electrolyte and provides energy with excellent cycle-life and rate capabilities.

The class of lithium intercalating transition metal oxides are particularly attractive as active materials for positive electrodes of rechargeable lithium batteries because of their inherently high energy content and ability to reversibly intercalate lithium ions at remarkably high rates. However, these materials are so highly oxidizing that very few electrolyte solvent combinations are stable with these electrodes. In particular, most ether solvents that are used very effectively in lithium battery applications have too low an oxidation potential for an electrode such as $Li_xCoO_2$. Some ester solvent based electrolytes have been found to perform well with the $Li_xCoO_2$ cathode but the lithium anode cycling efficiency is typically low in these electrolytes.

SUMMARY OF THE INVENTION

The general object of this invention is to provide a current producing reversible lithium intercalating electrode cell for use in the application of energy storage. A more particular object of the invention is to provide such a cell that is safer because it does not include free lithium. Another object of the invention is to provide a lithium intercalating electrochemical cell that produces energy safely and efficiently at moderate to high rates.

It has now been found that the foregoing objects can be attained by a $Li_xC_6/Li_xCoO_2$ anode/cathode couple in a dimethyl carbonate solvent electrolyte.

More particularly, the present invention uses no metallic lithium anode but instead a second lithium ion intercalating negative electrode. Hence, all problems inherent in cycling metallic lithium are avoided.

The new cell contains a lithiated graphite anode, $Li_xC_6$, dimethyl carbonate, DMC, solvent based electrolyte and a lithiated transition metal oxide cathode. The electrolyte includes a lithium salt (solute) in an organic solvent, DMC. DMC is an ester that cycles lithium with both graphite and $Li_xCoO_2$. Other ester solvent electrolytes that cycle lithium with the $Li_xCoO_2$ cathode are not good solvents for the graphite anode. Use of a lithiated graphite anode and $Li_xCoO_2$ cathode with DMC based electrolyte as a rechargeable cell results in a safe power source with good electrochemical performance. This increased safety enables the construction of larger cells. Also, because lithiated graphite, $Li_xC_6$, has a low voltage versus lithium, there is very little voltage loss for its substitution of lithium as an anode material.

An electrolyte based on DMC has the advantage of being electrochemically stable with both the $Li_xC_6$ anode and the $Li_xCoO_2$ cathode. A cathode of $Li_xCoO_2$ has a high cycle life, excellent rate capabilities and has a high voltage versus lithium. This results in an efficient combination capable of delivering a high voltage cell.

In the search for a lithium intercalating electrochemical system that produces energy safely and efficiently at moderate to high rates, it has been found that a $Li_xC_6/Li_xCoO_2$ anode/cathode couple in DMC solvent electrolyte can produce desired results.

DESCRIPTION OF THE PREFERRED EMBODIMENT

A typical graphite anode is fabricated by mixing 90 weight percent graphite with 10 weight percent binder such as teflon, where the weight percent of graphite or other carbons may range from 50 to 100 percent. This mixture is rolled onto a current collector such as nickel, stainless steel, or aluminum foil or screen. The graphite electrode can be lithiated electrochemically using a lithium electrode or chemically. The $Li_xC_6$ electrode can have an X range between 0.1 and 1.0.

Figure 1:
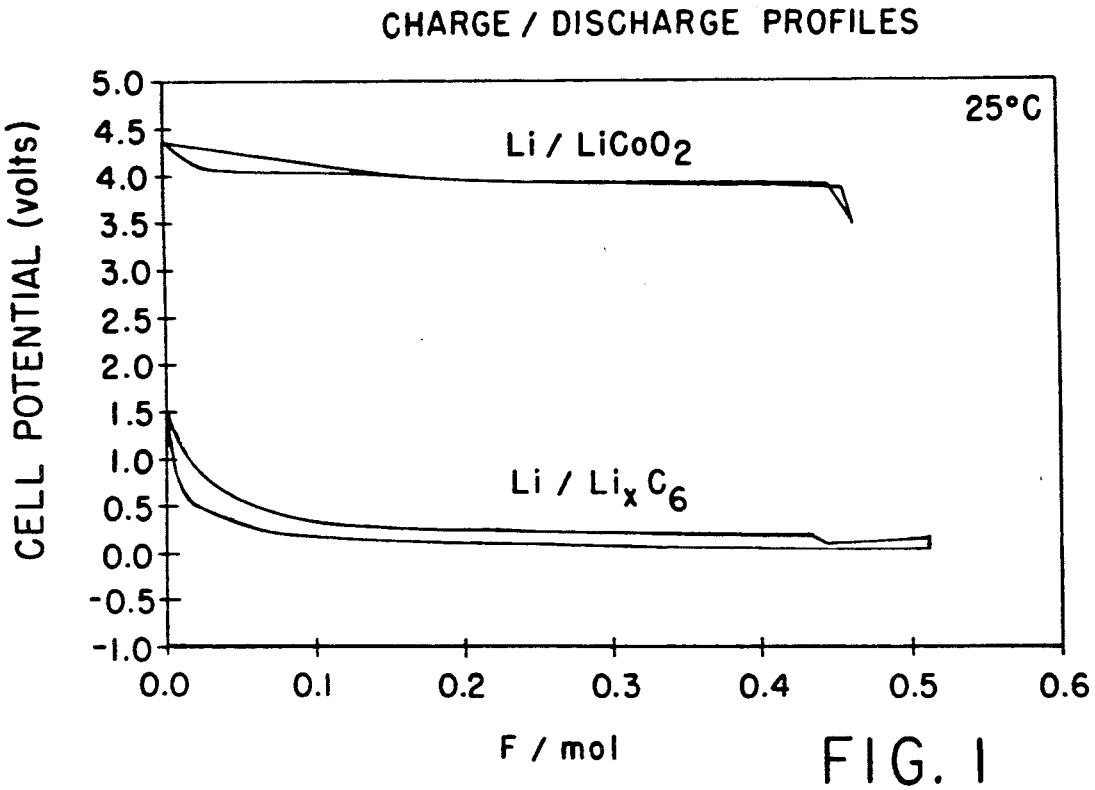
FIG. 1 demonstrates the charge/discharge profiles of half cells with lithium of $Li_xCoO_2$ and $Li_xC_6$ in 1 m $LiAsF_6$/DMC electrolyte.
Figure 2:
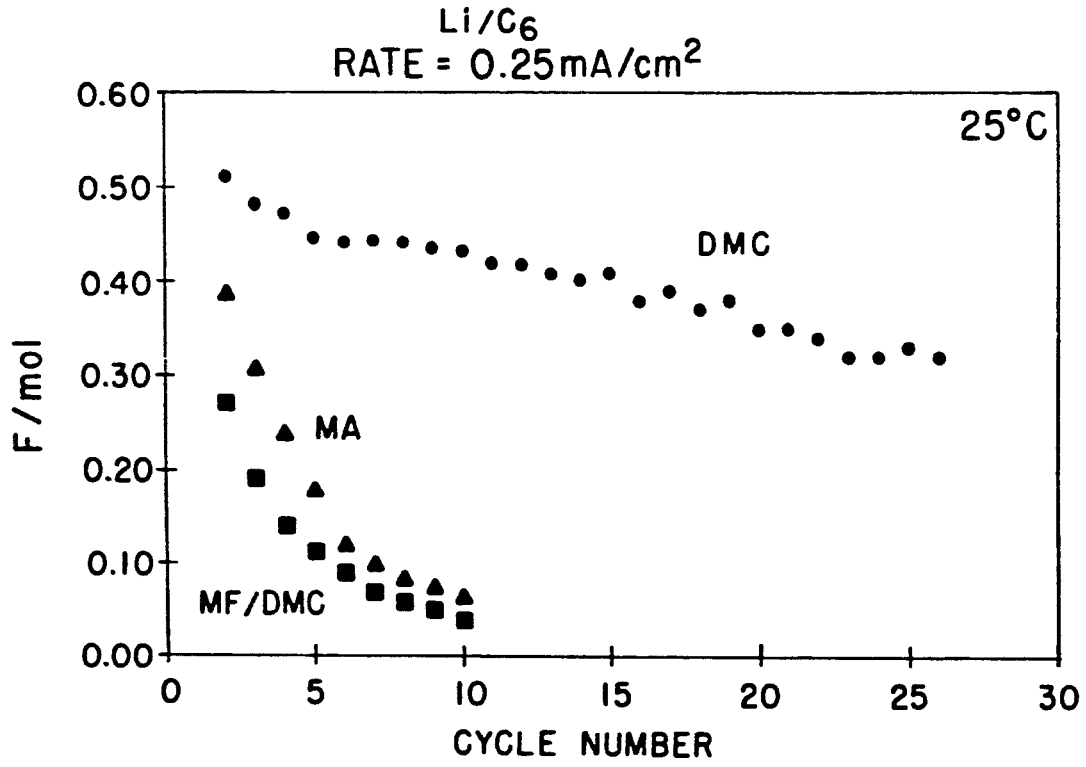
FIG. 2 shows the cycle life of lithium with graphite in various solvent electrolytes.

The electrolyte for the cell is about 1 m $LiAsF_6$ in DMC. FIG. 1 demonstrates half cell charge/discharge profiles for $Li/Li_xCoO_2$ and $Li/Li_xC_6$ in 1 m $LiAsF_6$/DMC. Each have flat profiles and a capacity of about 0.5 Faraday per mole. The $Li_xC_6$ electrode has an average voltage of 0.4 volt versus lithium that makes it a good anode material. In FIG. 2 is seen the excellent cyclability of the $Li_xC_6$ electrode with lithium in DMC electrolyte compared to other solvents such as methyl formate, MF and methyl acetate, MA. In addition, other lithium salts can be used such as $CF_3SO_3$, $LiClO_4$, or $LiBF_4$. Other solvents mixed with DMC may be substituted such as propylene carbonate, PC, MA, MF, acetonitrile, AN, diethyl carbonate, DEC, tetrahydrofuran, THF, ethyl carbonate, EC, and 2 methyl tetrahydrofuran, 2Me-THF.

The cathode includes a mix of 85 weight percent active material, $Li_xCoO_2$, 10 weight percent conductive diluent such as Vulcan VC-72 and 5 weight percent binder such as teflon. The weight percent of active material may range from 60 to 95 percent. The weight percent of conductive diluent may range from 0 to 30 percent and the weight percent of binder may range from 1 to 15 percent. Other active materials may be used such as $Li_xNiO_2$, $Li_xMnO_2$, $Li_xCrO_2$, $Li_xFeO_2$, $Li_xV_2O_5$ and $Li_xV_6O_{13}$. Other conductive diluents such as Shawinigan Acetylene Black, graphites, or other conductive materials may be used. In addition, other binders such as polyolefins or elastomers may be substituted for teflon. The electrode mix is rolled into a nickel, stainless steel or aluminum screen or foil.

Figure 3:
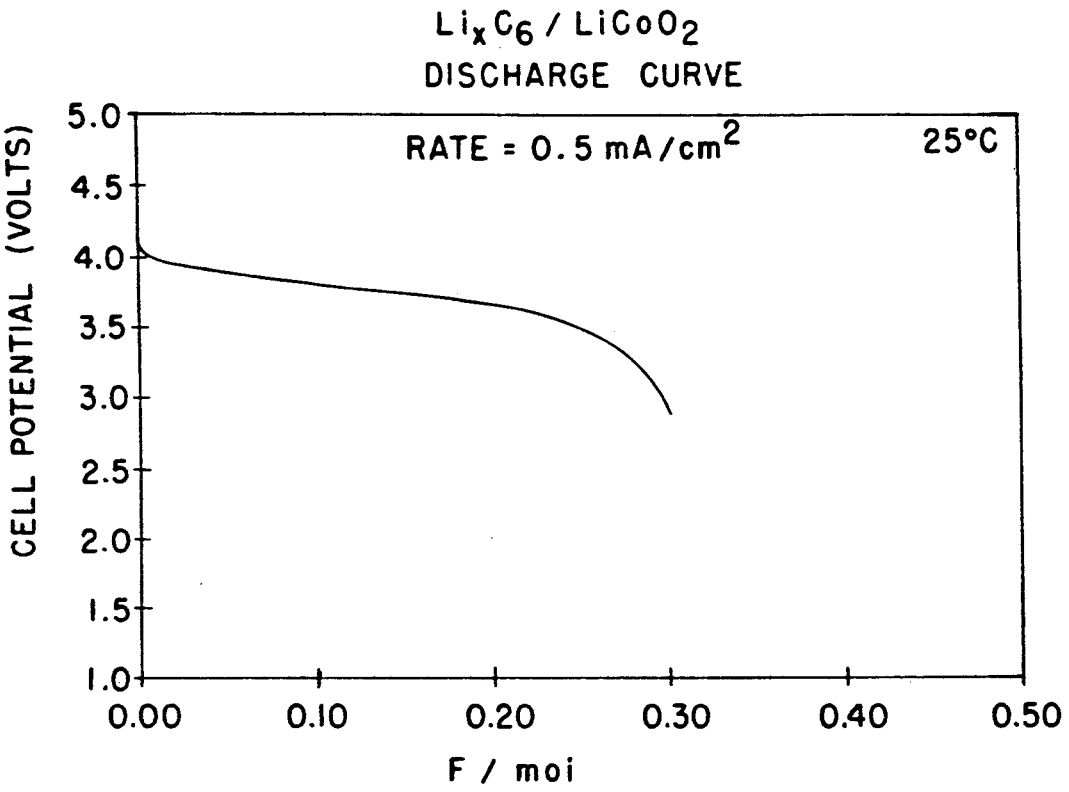
FIG. 3 illustrates the discharge profile of a $Li_xC_6/Li_xCoO_2$ cell in lm $LiAsF_6$/DMC.
Figure 4:
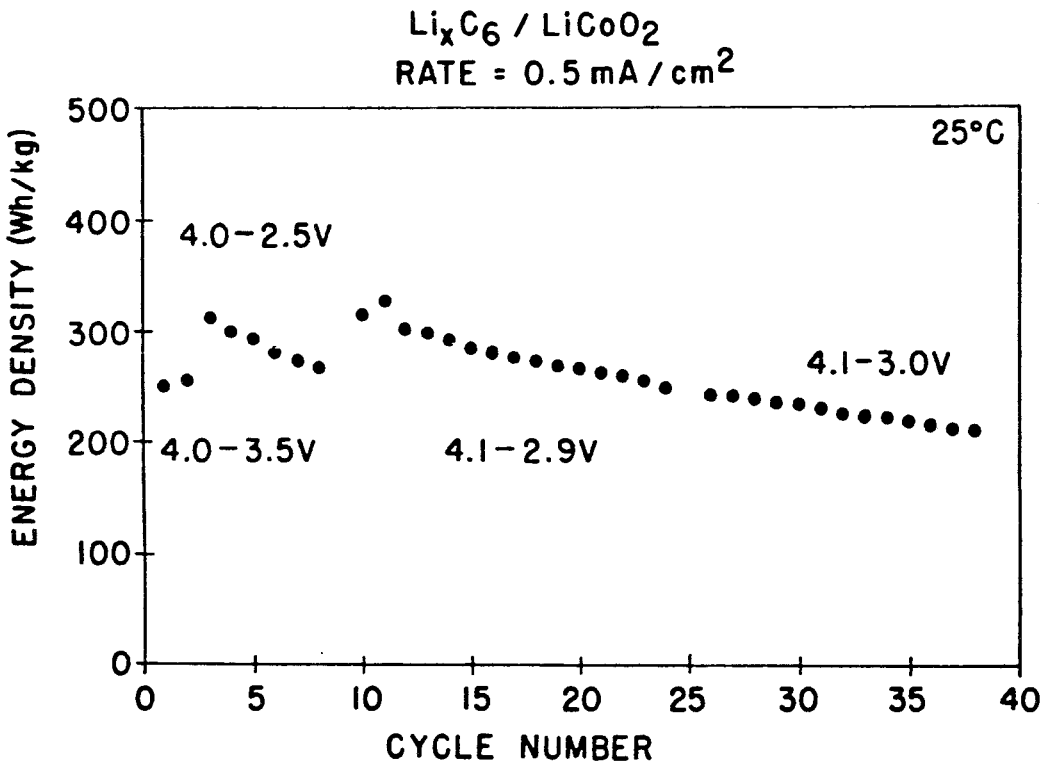
FIG. 4 shows the cycle life of $Li_xC_6/Li_xCoO_2$ cell in 1 m $LiAsF_6$/DMC at various charge/discharge voltage ranges.

A $Li_xC_6/LiAsF_6$-DMC/$LiCoO_2$ cell is demonstrated in FIGS. 3 and 4. FIG. 3 shows a discharge curve for the system. The cell has an average discharge potential of 3.7 volts. Lithium is intercalated from $LiCoO_2$ to $Li_xC_6$ on charge and returned on discharge. FIG. 4 shows the cycle life of the system at various voltage ranges. A range of 4.1 volts to 1.0 volt appears to be the most stable.

We wish it to be understood that we do not desire to be limited to the exact details of construction as described for obvious modifications will occur to a person skilled in the art.

What is claimed is:

1. A lithium ion rechargeable intercallation cell comprising a lithiated graphite anode, a lithiated oxide cathode, and a solution of a lithium salt in a solvent that cycles lithium with both the lithiated graphite anode and the lithiated oxide cathode as the electrolyte.

2. A cell according to claim 1 wherein the lithiated graphite anode is $Li_xC_6$, wherein the lithiated oxide cathode is selected from the group consisting of $Li_xCoO_2$, $Li_xNiO_2$, $Li_xMnO_2$, $Li_xCrO_2$, $Li_xFeO_2$, $Li_xV_2O_5$, and $Li_xV_6O_{13}$, wherein the lithium salt is selected from the group consisting of $LiAsF_6$, $LiCF_3SO_3$, $LiClO_4$, and $LiBF_4$, and wherein the solvent is selected from the group consisting of dimethyl carbonate, a mixture of dimethyl carbonate with propylene carbonate, a mixture of dimethyl carbonate with methyl acetate, a mixture of dimethyl carbonate with methyl formate, a mixture of dimethyl carbonate with acetonitrile, a mixture of dimethyl carbonate with diethyl carbonate, a mixture of dimethyl carbonate with tetrahydrofuran, a mixture of dimethylcarbonate with ethyl carbonate, and a mixture of dimethyl carbonate with 2-methyl tetrahydrofuran.

3. A cell according to claim 2 wherein the lithiated graphite anode is $Li_xC_6$, wherein the lithiated oxide cathode is $Li_xCoO_2$, and wherein the electrolyte is about 1 molar $LiAsF_6$ in dimethyl carbonate.

* * * * *